W. H. HAZZARD.
Window-Screen.
No. 217,283. Patented July 8, 1879.
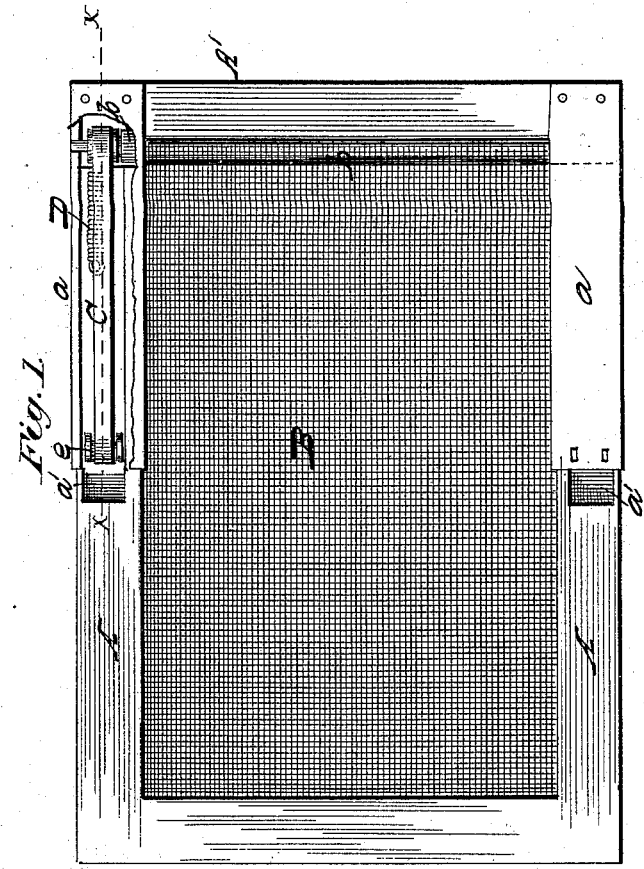
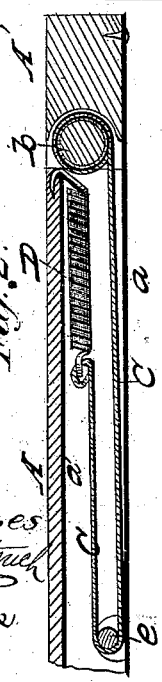
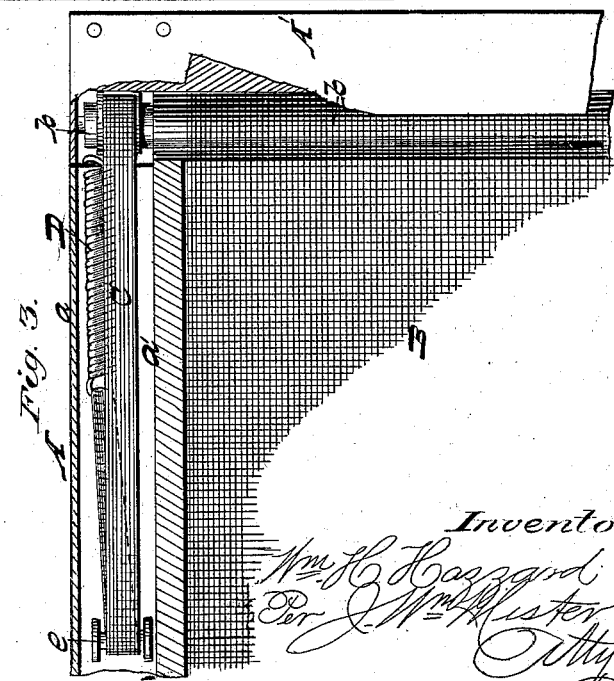

UNITED STATES PATENT OFFICE.

WILLIAM H. HAZZARD, OF EASTON, PENNSYLVANIA.

IMPROVEMENT IN WINDOW-SCREENS.

Specification forming part of Letters Patent No. 217,283, dated July 8, 1879; application filed February 8, 1879.

*To all whom it may concern:*

Be it known that I, WILLIAM H. HAZZARD, of Easton, in the county of Northampton and State of Pennsylvania, have invented certain new and useful Improvements in Window-Screens; and I do hereby declare that the following is a full, clear, and exact description thereof, sufficient to enable others skilled in the art to which my invention appertains to make and use the same, reference being had to the accompanying drawings, and to the letters of reference marked thereon, and in which—

Figure 1 is a side view of my improved window-screen, and Fig. 2 is a section on the line $x$ $x$ of Fig. 1. Fig. 3 is an enlarged detail view.

The same part in the several figures is denoted by the same letter.

This invention relates to certain improvements in window-screens, the object of which is to provide for the accommodation of the screen to windows of different widths, the automatic taking up of slack of the screen-winding tape or its equivalent, and the holding of the same under tension, by which, when the screen proper is unrolled or distended, the said screen proper, in addition to being held tightly or properly stretched in the latter position, will also be enabled to be wound upon its roll tightly and with greater facility as the screen is contracted.

To these ends my invention consists in the employment of a two-part frame, with the side pieces of one part fitting within the sides of the other section, and provided with chambers, within which frame is stretched the screen proper, one end thereof being attached to a roll or roller, to which roll, or pulleys thereon, are attached tapes or bands, passing around rollers or pulleys fastened to one of the sections of the frame, and thence connected to springs secured to the inclosed ends of the other section of the frame, substantially as hereinafter more fully set forth.

In the accompanying drawings, A A' refer to a frame made in two parts, one fitting within the other, and admitting of the expansion and contraction of the screen, to accommodate it to different widths of windows. This is especially desirable in moving from house to house or place to place, the windows of which are very likely to be of different widths.

The inclosed portions or sides of the section A are provided with slots or grooves $a'$ $a'$, to provide for the reception and passage of the screen-rolling tapes, as presently described.

B is the screen proper, stretched within the frame A A', with one end fastened to the end piece of section A, and the other end fastened to a roll or roller, $b$, hung in the side pieces of the section A', as clearly seen in Figs. 1 and 3.

The screen B is wound or rolled upon the roller or roll $b$ as the two parts or sections of the frame are compressed, and unrolled or distended as the said parts of frame are extended or lengthened, as to widen the screen.

C C are tapes, or other equivalent material, attached to the ends of the roll or pulleys thereon, and around which they are rolled or coiled a number of times. They are next passed through the grooves or slots $a'$, over pulleys $e$ $e$, whose shafts are hung in plates fastened to the inner sides of the cases $a$ of the section A' of the frame. After this they are extended and connected to springs D D, fastened to the inner or inclosed ends of the section A' of the frame.

By this arrangement it will be observed that, as the two parts or sections of the screen-frame are pulled so as to widen the screen, the tapes or bands C will be wound or coiled upon the pulleys on the ends of the roll $b$, distending their springs D, by which the screen proper, B, will be stretched tightly in the frame A A', and the said bands or tapes be held under tension, which will, in turn, as the parts of the frame are contracted, take up slack and effect the unwinding of the tapes or bands, causing the rotation of the roller $b$, which will effect the rolling up of the screen proper, B, thereon.

Having thus fully described my invention, I claim and desire to secure by Letters Patent—

A window-screen consisting of the two-part frame A A', with the side pieces of one of its parts provided with chambers $a'$, and fitting within sockets $a\ a$ of the other part, the screen proper, B, roll $b$, tape or band C, pulley or roll $e$, and spring D, all constructed and operating substantially as and for the purpose set forth.

In testimony whereof I hereunto annex my signature in presence of two subscribing witnesses.

WILLIAM H. HAZZARD.

Witnesses:
 PEACE BARNITT,
 JOHN TINDALL.